United States Patent [19]

Helms

[11] 4,200,306
[45] Apr. 29, 1980

[54] UNIVERSALLY SWIVELING TRACTOR HITCH

[75] Inventor: Bland E. Helms, Rte. #3, Box 451 A, Fort Pierce, Fla. 33451

[73] Assignee: Bland E. Helms

[21] Appl. No.: 915,804

[22] Filed: Jun. 15, 1978

[51] Int. Cl.² ............................................. B60D 1/00
[52] U.S. Cl. .................................. 280/494; 280/504; 403/57
[58] Field of Search .......... 280/492, 493, 494, 491 A, 280/504; 180/14; 403/57

[56] References Cited

U.S. PATENT DOCUMENTS

| | | | |
|---|---|---|---|
| 2,867,452 | 1/1959 | Ricklick | 280/492 |
| 3,446,175 | 5/1969 | Boehler | 180/14 R |
| 3,490,790 | 1/1970 | Kees | 280/492 X |
| 3,630,302 | 12/1971 | Holland | 180/14 A X |
| 3,730,557 | 5/1973 | Cox | 280/492 X |
| 3,890,005 | 6/1975 | Sien | 180/14 R X |
| 4,079,955 | 3/1978 | Thorpe | 280/492 X |

FOREIGN PATENT DOCUMENTS 1325367  3/1963  France ..................... 280/492

*Primary Examiner*—John P. Silverstrim
*Attorney, Agent, or Firm*—Elizabeth Newton Dew; Arthur Wells Dew

[57] ABSTRACT

A hitch for connecting a tractor to an agricultural implement, enabling relative angular movement of the two, about three mutually normal axes and characterized by great strength, rigidity and ease of fabrication without machining, from readily obtainable forms and shapes.

2 Claims, 7 Drawing Figures

UNIVERSALLY SWIVELING TRACTOR HITCH

BACKGROUND OF THE INVENTION

The present trend to farms, ranches and fruit groves of everincreasing acreage is the result of the need to reduce unit costs of production. As a result, implements such as fertilizer and insecticide spreaders and sprayers, plows, cultivators, harvesters pickers and many other kinds and types are made of constantly-increasing sizes and capacities. Likewise the tractors required to power the larger and heavier implements, must be correspondingly increased in size and power. Whereas the small tractors of earlier years were relatively inexpensive, those used to-day are so costly that it is necessary as a matter of simple economics, to utilize them as nearly continuously as possible, in order to pay interest on their purchase price and amortize the investment. This is also true of the implements themselves although, of course, many of these, such as plows and harvesters can only be used seasonally or occasionally. But such costly implements can only be economically justified by keeping them working as many days as possible throughout the year. This means greater acreage per implement.

The foregoing considerations call for a hitch by which heavy-duty tractors may be readily coupled to and uncoupled from a multiplicity of implements of large capacities. A tractor-implement combination is only as useful as the hitch by which the two are coupled; and so that hitch must be capable of pulling the heaviest and largest of a great assortment of agricultural implements available to-day. It is therefore necessary that modern hitches be extremely strong in proportion to their weight, and pulling power, relatively simple to fabricate and repair, and, most importantly, just about 100% reliable in operation. Even one breakage of a hitch at use in the field can result in the loss of several hundreds of dollars in wages and down time of the machines.

Prior art hitches are either too weak to cover the higher ranges of pull encountered to-day, or they are unduly complicated and expensive to build, service and repair. Many of them embody specially-shaped parts requiring costly forging, stamping, pressing or machining. Even more important, many prior art hitches, due to their complicated construction and multiplicity of parts, are difficult to engineer correctly. For instance it is obviously a desideratum of a well-engineered hitch, that the pull from tractor to implement pass through the hitch as simply and directly as possible, without numerous interchanges between shear, tension and bending moments. For each such interchange requires an engineering computation taking into consideration a factor of safety, and allowable strength of the metal in shear, tension and bending. The result is that often one part will be made too light or weak and thus fail in service, while another will be overly strong and heavy.

SUMMARY OF THE INVENTION

It is the object and purpose of this invention to provide a universally-swiveling tractor hitch which, while extremely powerful and reliable in operation, can be fabricated from readily-available steel shapes and forms, and assembled by welding or otherwise, without machining.

It is a further object to provide a hitch which transmits pull or tension to the implement in a simple and direct path such that the size and strength of its component parts may be readily and correctly computed with the result that those parts are properly proportioned for combined maximum strength with minimum mass or weight for each part.

As a corollary it follows as an object that the hitch of this invention, being extremely reliable in operation, largely eliminates down time in the field otherwise resulting from broken parts, and thus reduces costs of production.

Another object is to provide a hitch as aforesaid wherein, because it permits swiveling about any one of three mutuallynormal axes, or about two or more of such axes simultaneously, eliminates the transmission of torsion from tractor to implement and vice versa, thus enhancing reliability and satisfactory service as well as useful power transmitted.

Other objects and advantages of the invention will become clear to those skilled in the art, after a study of the following detailed description, in connection with the accompanying drawing.

DESCRIPTION OF THE PREFERRED EMBODIMENT

Figure 1:
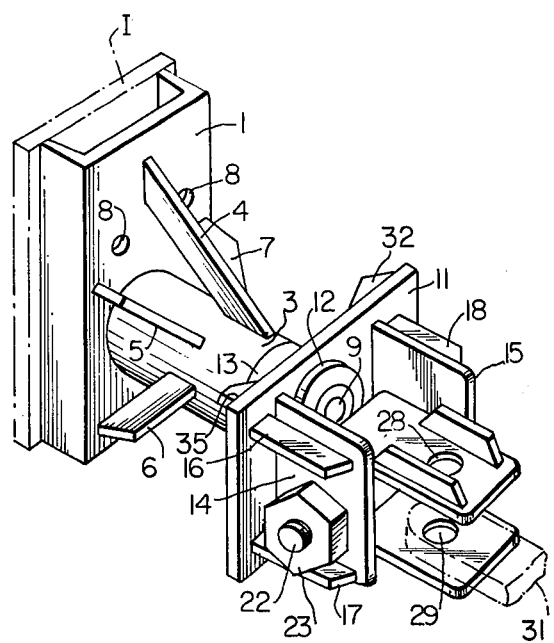
FIG. 1 is a perspective view of the invention in position connecting the drawbar of a tractor to an agricultural implement such as an insecticide or fertilizer spreader.
Figure 5:
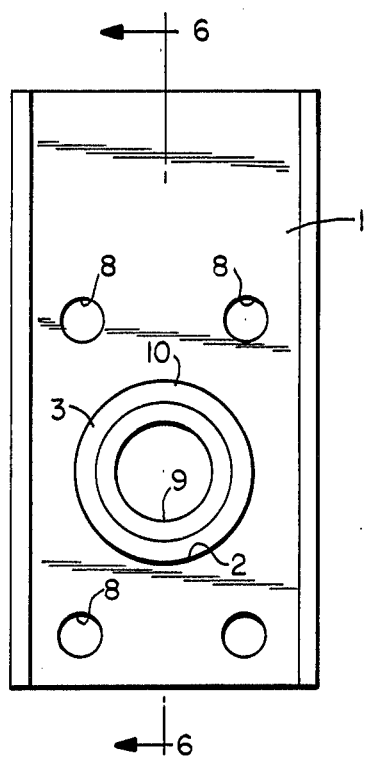
FIG. 5 is an elevational view of the hitch detached, as seen from the rear.

Referring particularly to FIG. 1, a metal base 1, which may conveniently be a length of steel channel, has a hole 2 (see also FIG. 6) symmetrical with its vertical center line and, in the model shown, nearer the lower end of the channel. See also FIG. 5. The hole is sized to receive with a good fit, one end of a length of steel tube 3 welded to the channel in position such that its longitudinal axis is normal to the base of the channel. Brace bars 4, 5, 6 and 7 are welded at their respective ends to the base and the forward end of tube 3, as clearly shown upon FIG. 1, to rigidify the assembly and afford a very strong pivot bearing with axis normally extending in the horizontal, fore-and-aft direction. Holes 8, FIG. 5, through the base of channel 1, afford means by which the hitch may be bolted to the drawbar of an agricultural implement.

Figure 6:
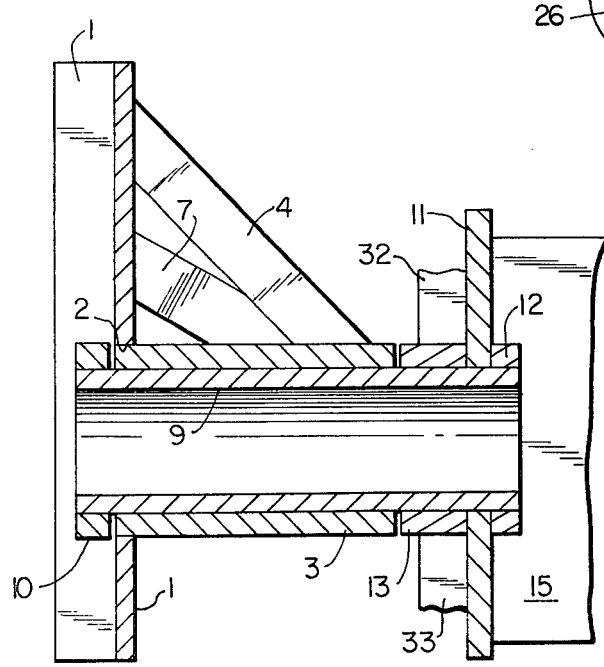
FIG. 6 is a detail sectional view taken in a plane identified by line 6—6, FIG. 5.

Referring in particular to FIG. 6, a length of steel tube 9 is sized for a smooth bearing or rotational fit in and along tube 3. At its left end as viewed in this figure, tube 9 has a ring or collar 10 welded or threaded thereto. A rectangular plate 11 has a hole centrally therethrough to receive with a smooth fit, the right end of tube 9, as viewed upon FIG. 9. The plate and tube are welded together. Rings or collars 12 and 13 also fitting on and about tube shaft 9, are welded thereto and to the plate on respective sides thereof. Four equiangularly-spaced reinforcing bars 32, 33, 34 and 35 extend radially of ring or tube section 13 and are welded to them, to effect a strong and rigid element or part. Thus as will be noted, the integrally-connected parts 9 and 11 are journaled in tube 3, for rotation as a unit about the axis of tube 9, which axis is normally horizontal and in the fore-and-aft direction. One or more grease nipples, not shown, are threaded into apertures in tube 3 and facilitate lubrication of the bearing surfaces between 3 and 9.

Figure 4:
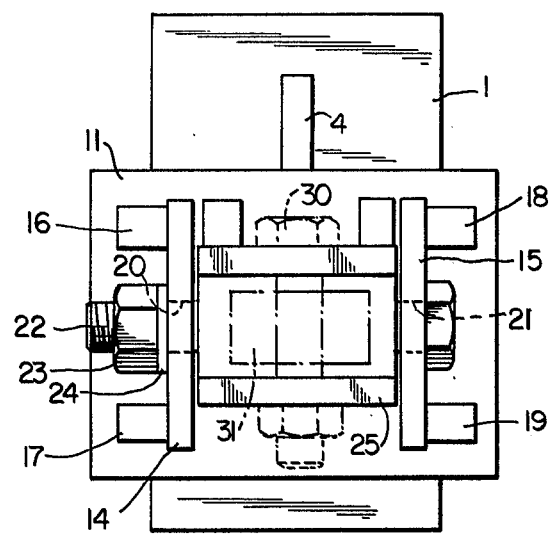
FIG. 4 is an elevational view of the hitch detached and as seen from the front.

Plate 11 has first and second bearing lugs or trunnions 14 and 15 welded thereto in horizontally-spaced parallel relation. As shown upon FIG. 1, these lugs or trunnions are fixed to the forward side of the plate in symmetrical relation upon opposite sides of the common axis of tubes 3 and 9. Brace bars such as 16 and 17 for lug 14, FIG. 1, are welded to the lug and plate. Corresponding bars for lug 15 are identified at 18, 19, FIG. 4. See also FIG. 1.

Figure 7:
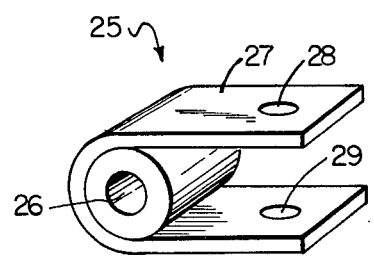
FIG. 7 is a perspective view of one component part, namely the yoke pivotally attached to the tractor.
Figure 3:
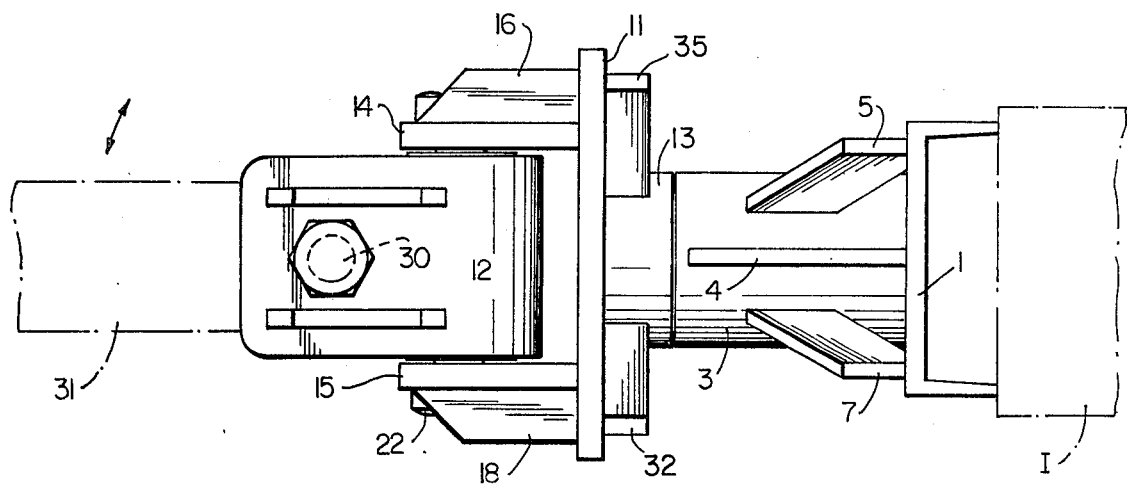
FIG. 3 is a top plan view corresponding to FIG. 2.
Figure 2:
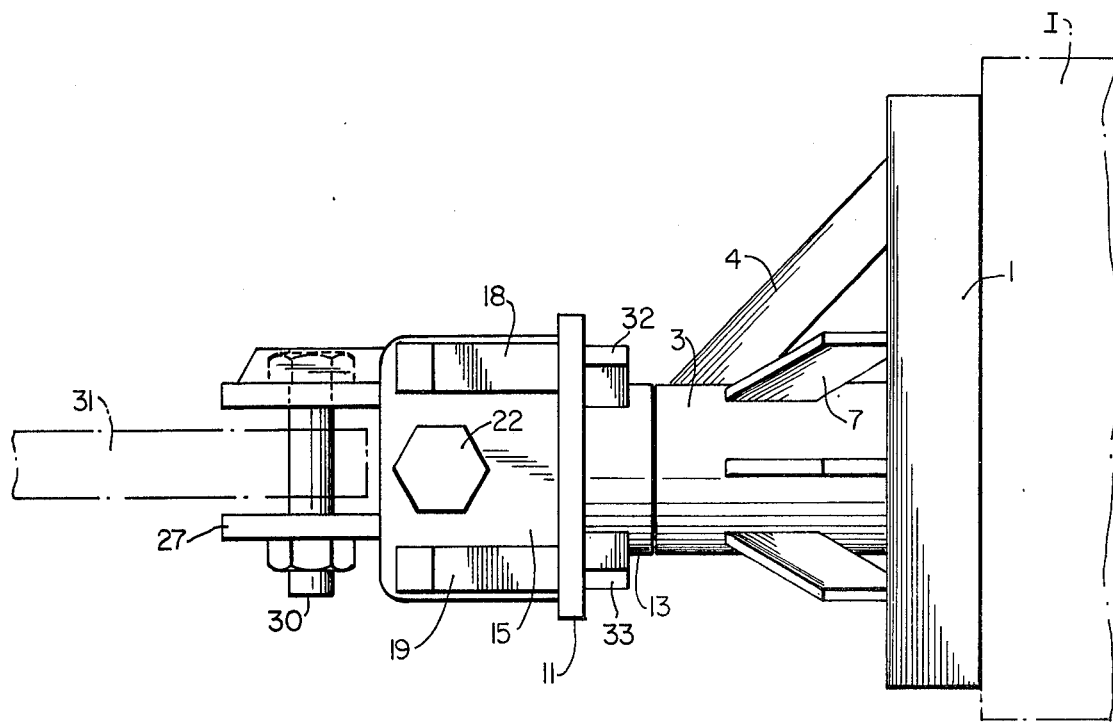
FIG. 2 is a side elevation to an enlarged scale, illustrating the normal position of the hitch in use.

The lugs are pierced by transversely-aligned holes 20 and 21, (FIG. 4), which form bearings to receive a pivot bolt 22 secured in position by nut 23 and washer 24 to mount for pivotal movement about a normally transverse horizontal axis, a yoke or clevis generally identified at 25, noting FIG. 7 in particular. This yoke comprises a section of tubing 26 of a length to have a smooth fit between trunnion lugs 14, 15, and an internal diameter receiving bolt 22, also with a smooth fit. As seen upon FIG. 7, the yoke also includes a metal strap 27 of essentially the same width as the length of tube 26 and bent therearound through 180° and welded thereto to form a pair of forwardly-directed, vertically-spaced arms pierced at their forward ends with holes 28, 29 defining a vertical axis. When the tractor is backed until its drawbar 31 enters between the forwardly-projecting arms of yoke 25 so that the hole therein is aligned with holes 28, 29, bolt 30 is passed downwardly through the three holes to couple the tractor to the implement's drawbar or plate indicated at I, FIGS. 1, 2 and 3.

Use of the invention will be generally clear from the foregoing description. When the tractor and implement in service are connected as aforesaid and rest on an essentially horizontal surface, they are coupled for universal swiveling or relative pivoting, first about a vertical axis defined by bolt 30, secondly about a horizontal transverse axis defined by bolt 22, and thirdly about a horizontal fore-and-aft axis defined by the axis of tubular shaft 9. Thus the two machines are connected to accommodate angular movements between them, about three mutually-normal axes so that all couples and bending moments which might otherwise bend or break parts or interfere with smooth operation thereof are eliminated. Also noted is that all parts of the novel hitch are formed of readily obtainable steel shapes and forms such as channels, tubing, straps, bars and bolts. Thus machining and grinding are avoided and only welding is necessary to unite the parts into an extremely powerful hitch, long-lived and reliable in operation and relatively inexpensive to fabricate.

It is of interest to note that in the present invention the pull of the tractor results in pure tension in drawbar 31. This is converted to shear in pin 30. The arms of yoke 25 are in tension equal to the shear in the bolt and is again converted to shear in bolt 22, then to tension in lugs 14, 15 and shaft 9. As all resultant forces in shear and tension are equal and pass in a straight line from tractor to implement, the correct cross-sectional areas are readily computed for adequate strength while at the same time avoiding excessive cross sectional dimensions. Due to the foregoing facts, bending moments which might otherwise unduly stress the hitch, are avoided.

As modifications and changes in shape, size and relation of assembled component parts are possible, the foregoing disclosure is to be taken in an illustrative rather than a limiting sense.

It is within the purview of this invention, to make tubes 3 and 9 of high carbon or case hardened steel to enhance the strength and wearing qualities thereof.

In the claims, for clarity in pointing out the invention, the terms "horizontal", "vertical", "normal", etc., refer to the position of the parts of the hitch when connected between a tractor and implement resting upon a substantially plane horizontal surface, and are not to be interpreted as limiting the hitch to use in a position with its defined axes in a fixed relation with the horizontal and vertical. The term "fore-and-aft", "forward" and "rearward" relate to the horizontal direction of travel when the tractor is pulling the implement straight ahead.

I claim:

1. A hitch for connecting a tractor to an agricultural implement to be drawn thereby, comprising, a normally-vertical channel section for rigid attachment to the implement, a first tube section having its rearward end fitting a hole in and through said channel section and rigidly and integrally fixed to and with said section, and extending forwardly and horizontally therefrom, to define a normally-horizontal fore-and-aft first pivot axis, a second tube section fitting and rotatably journaled within said first tube section for rotation about said first axis, a first collar fixed with and fitting about the rearwardly-projecting end of said second tube section, a generally flat plate having an aperture fitting about and receiving with a smooth fit, the forward end of said second tube section and integrally attached to said second tube section, normal thereto, second and third collars fixed with the forward end of said second tube section, upon opposite sides of said plate, respectively, and integrally fixed with said plate and second tube section, said second collar abutting the forward end of said first tube section for preventing relative translation between said first and second tube sections along said first axis, first and second trunnions fixed with said plate to extend forwardly thereof and symmetrically disposed on opposite sides of said first axis, said trunnions having respective ones of a first pair of transversely aligned bearings defining a second pivot axis normal to and intersecting said first axis, a clevis fitting between said trunnions and including vertically-spaced parallel forwardly-extending arms, a third tube section integrally fixed with and within the bight portion of said clevis, a pivot bolt having its ends journaled in said first pair of aligned bearings and having a smooth bearing in and through said third tube section, to pivot said clevis about said second axis, there being a pair of vertically aligned holes in and through the respective distal ends of said arms and defing a third pivot axis normal to said first and second axes and intersecting said second axis.

2. The hitch of claim 1, and a plurality of brace bars, each in a respective one of a plurality of angularly-related planes through said first axis, each said bar being welded at one end to said base and extending forwardly and radially inwardly, with its other end welded to said tube section at equi-angularly-spaced points thereabout.

* * * * *